US008562214B2

(12) United States Patent
Dozier et al.

(10) Patent No.: US 8,562,214 B2
(45) Date of Patent: Oct. 22, 2013

(54) WATERPROOF TRUCK BAG

(76) Inventors: Timothy Mathew Dozier, Mobile, AL (US); Philip Mathew Dozier, Dothan, AL (US)

(*) Notice: Subject to any disclaimer, the term of this patent is extended or adjusted under 35 U.S.C. 154(b) by 169 days.

(21) Appl. No.: 12/926,450

(22) Filed: Nov. 18, 2010

(65) Prior Publication Data

US 2011/0129169 A1   Jun. 2, 2011

Related U.S. Application Data

(60) Provisional application No. 61/272,983, filed on Nov. 30, 2009.

(51) Int. Cl.
*B65D 30/00* (2006.01)
*B65D 33/14* (2006.01)

(52) U.S. Cl.
USPC ............ 383/108; 383/105; 383/24; 383/16; 383/113; 224/572; 224/404

(58) Field of Classification Search
USPC ........ 383/105, 24, 22, 16, 108, 113; 224/403, 224/404, 542, 572, 328, 319, 318; 114/345; 296/100.16, 100.18, 39.2
See application file for complete search history.

(56) References Cited

U.S. PATENT DOCUMENTS

| | | | | |
|---|---|---|---|---|
| 3,965,953 A * | 6/1976 | Becker et al. | ................. | 383/6 |
| 4,718,583 A * | 1/1988 | Mullican | ................. | 224/404 |
| 4,875,596 A * | 10/1989 | Lohse | ................. | 220/1.6 |
| 4,877,281 A * | 10/1989 | Altmann | ................. | 296/39.1 |
| 5,378,034 A * | 1/1995 | Nelsen | ................. | 296/39.2 |
| 5,824,995 A * | 10/1998 | Wise | ................. | 219/393 |
| 5,868,295 A * | 2/1999 | Carriere | ................. | 224/404 |
| 6,105,842 A * | 8/2000 | Cesare | ................. | 224/404 |
| 6,132,088 A * | 10/2000 | Suzuki | ................. | 383/23 |
| 6,155,772 A * | 12/2000 | Beale | ................. | 414/607 |
| 6,349,865 B1 * | 2/2002 | Tolley et al. | ................. | 224/404 |
| 6,561,355 B1 * | 5/2003 | Forbes et al. | ................. | 206/527 |
| 6,902,087 B2 * | 6/2005 | Hancock et al. | ................. | 224/401 |
| 7,219,944 B2 * | 5/2007 | Klotz et al. | ................. | 296/39.1 |
| 2003/0126673 A1* | 7/2003 | Yardley | ................. | 2/272 |
| 2004/0094589 A1* | 5/2004 | Fricano | ................. | 224/404 |
| 2004/0190799 A1* | 9/2004 | Hess et al. | ................. | 383/66 |
| 2006/0222270 A1* | 10/2006 | Modena | ................. | 383/38 |
| 2006/0280390 A1* | 12/2006 | Richardson et al. | ................. | 383/121 |
| 2007/0018444 A1* | 1/2007 | Gibson | ................. | 280/759 |
| 2007/0127852 A1* | 6/2007 | Town et al. | ................. | 383/16 |

* cited by examiner

*Primary Examiner* — Nathan J Newhouse
*Assistant Examiner* — Matthew Theis
(74) *Attorney, Agent, or Firm* — Jacobson Holman PLLC

(57) ABSTRACT

A large, waterproof bag that is sized to fit into the bed of a pick-up truck. The bag is fully sealed by a zipper and an overlapping flap at an opening at one end of the bag. The flap covers and protects the zipper. The waterproof bag is used to store luggage and other goods in a safe, waterproof environment in the truck bed. The bag features eight hook assemblies attached at each corner of two opposed surfaces of the bag that can be used to secure the bag in place during travel.

8 Claims, 5 Drawing Sheets

WATERPROOF TRUCK BAG

This is a complete application which claims priority from and the benefit of U.S. Provisional Patent Appln. Ser. No. 61/272,983 filed Nov. 30, 2009.

FIELD OF THE INVENTION

The present invention relates to the field of a storage bag, immune to the elements, and adapted to be anchored in a bed of a pick-up truck in either a horizontal or vertical orientation.

BACKGROUND OF THE INVENTION

All pick-up truck beds are open to the outside elements. To transport goods in the truck bed, the goods must be able to withstand the elements, or have some sort of protection, such as a tarp.

However, to ensure that the protection stays in place during transit and over long distances, a secure system is desired to provide complete waterproof protection against the elements. This system needs to be easy to set-up and secure in its positioning on the bed of the truck.

SUMMARY OF THE INVENTION

The present invention offers a non-permanent solution to waterproof storage during travel.

The present invention is directed to a large, waterproof bag that is sized to fit into the bed of a pick-up truck. The bag is fully sealed by a zipper and an overlapping flap at an opening at one end of the bag. The flap covers and protects the zipper.

The waterproof bag is used to store luggage and other goods in a safe, waterproof environment in the truck bed. The bag features eight hook assemblies attached at each corner of two opposed surfaces of the bag that can be used to secure the bag in place during travel. Each bag is durable enough to withstand the outside elements, but light in weight for easy transport and storage.

The waterproof bag is anchored in the bed of a pick-up truck in either a horizontal or vertical orientation. A series of anchor loops are positioned at each of four corners on two opposed sides of the bag.

The anchor loops are sewn to a backing flap. The backing flap is adhered by an adhesive and heat sealed to a larger anchoring patch. The thus formed unit is adhered to and heat sealed to the surface of the bag to form an anchoring assembly.

A bag, mounted in either horizontal or vertical position, is anchored by four of the anchor assemblies. The anchoring assemblies are located on an upper surface of the bag when the bag is positioned in a horizontal orientation. When the bag is positioned in a vertical orientation, two anchoring assemblies located on two opposed sides of the bag at an upper portion of the bag are used to secure the bag in place. A series of four rope or bungee cords are used to secure the bag to opposed side rails of the bed of the pick-up truck in either the horizontal or the vertical orientation.

Accordingly, it is an object of the present invention to provide a waterproof bag of a rectangular or square configuration having a series of anchoring assemblies located at each of four corners on two opposed surfaces of the bag.

It is another object of the present invention to provide a waterproof bag of a rectangular or square configuration having a series of anchoring assemblies located at each of four corners on two opposed surfaces of the bag with the anchoring assemblies sewn, adhesively secured and heat sealed to the two opposed surfaces of the bag.

It is still yet another object of the present invention to provide a waterproof bag of a rectangular or square configuration having a series of anchoring assemblies located at each of four corners on two opposed surfaces of the bag with the anchoring assemblies sewn, adhesively secured and heat sealed to the two opposed surfaces of the bag and having an elongated zipper at one end of the bag with a covering flap providing protection from the elements to the zipper of the bag.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

Figure 1:
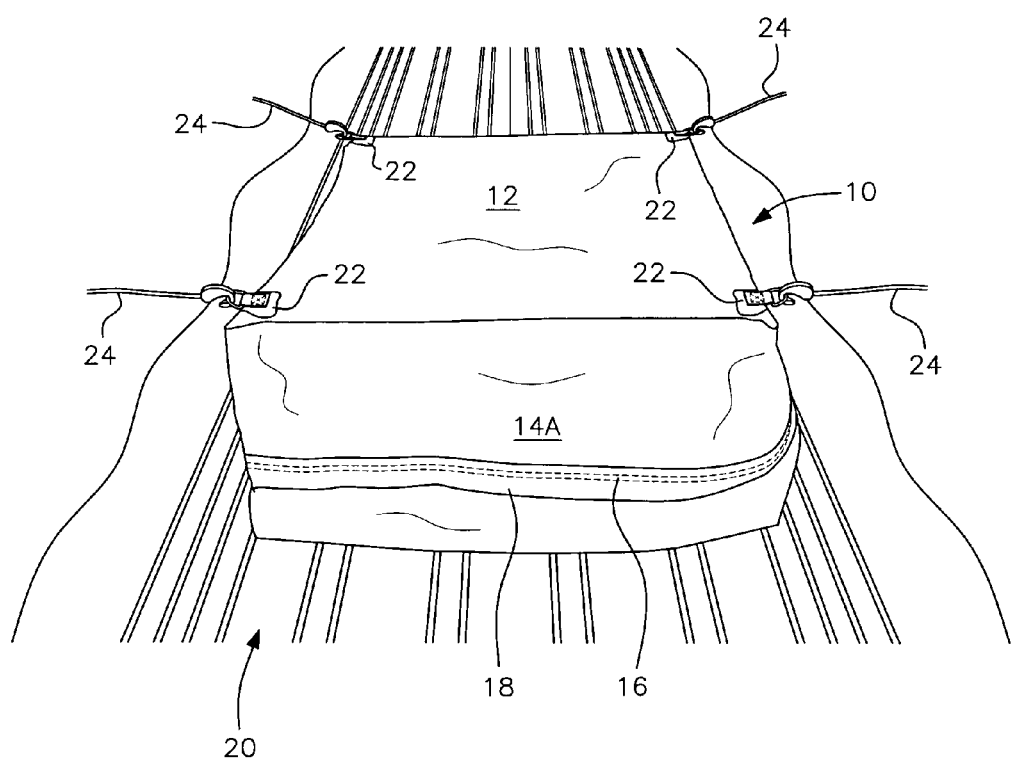
FIG. 1 is a perspective view of a truck bag of the present invention in a horizontal orientation secured in a bed of a pick-up truck.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and the FIGS. 1 through 4, in particular, a truck bag embodying the teachings of the subject invention is generally designated as 10. With reference to its orientation in FIG. 1, the truck bag includes an upper surface 12 of rectangular or square shape, preferably 40 inches wide by 50 inches long. The sidewalls 14A and 14B are typically 40 inches long by 22 inches high. The sidewalls 14C and 14D are approximately 50 inches long and 22 inches high. Typically, 26 cubic feet of storage space is provided.

A zipper 16 is located in approximately the middle of sidewall 14A. The zipper has a length of approximately 50 inches and extends centrally through the sidewall 14A and partially around and onto the sidewalls 14C and 14D for a distance of approximately five inches. A two-inch wide flap 18 covers the zipper 16 to protect the zipper from exposure to the elements.

In FIG. 1, the truck bag is shown in a horizontal orientation on the bottom surface 20 of a truck bed. Surface 12 of the truck bag includes four anchoring loop assemblies 22 at each of the four corners of the upper surface 12. Secured to each of the anchor loop assemblies is a bungee cord or rope 24 for tying and securing the truck bag 10 to the sidewalls (not shown) of the pick-up truck.

Figure 2:
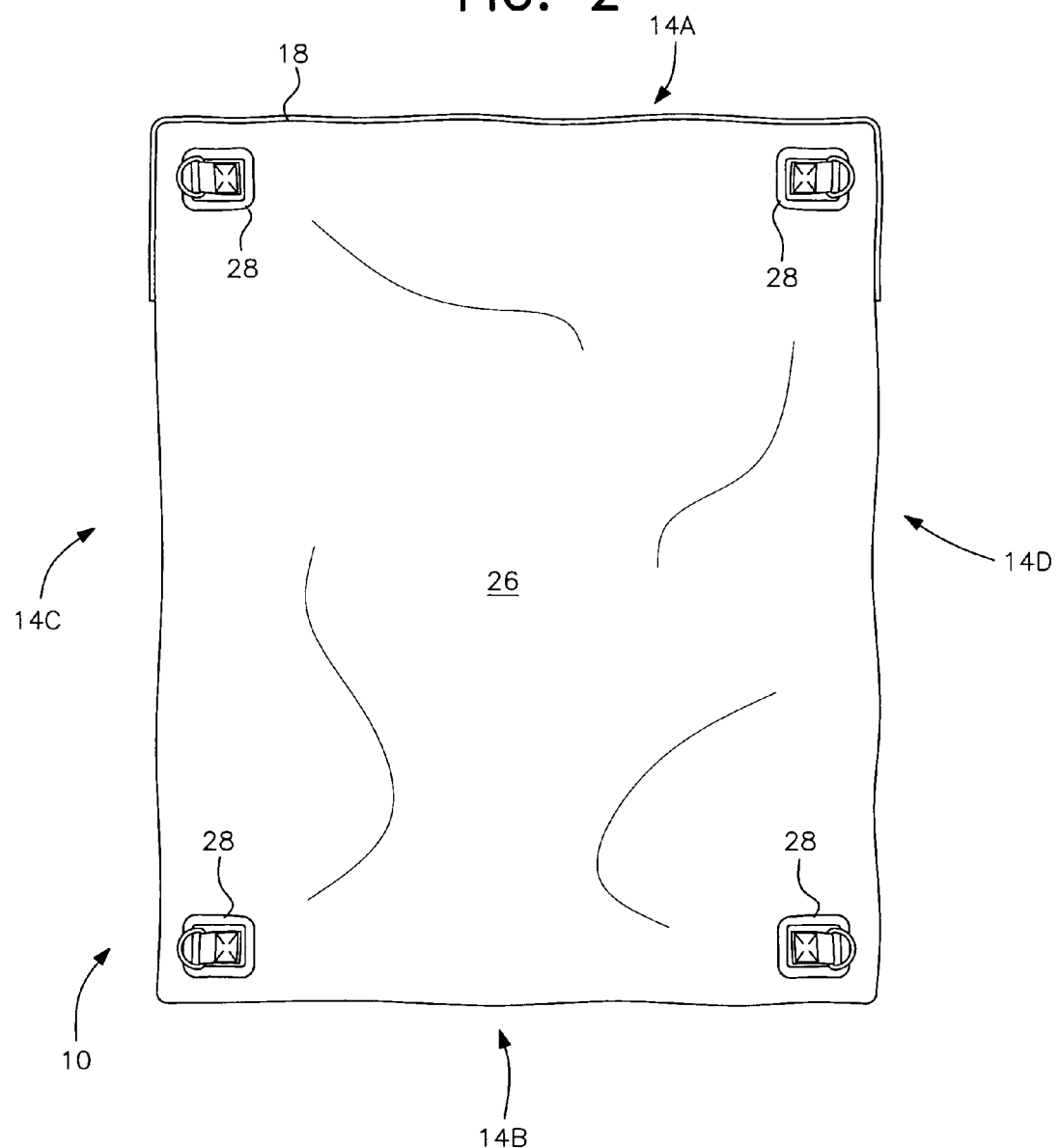
FIG. 2 is a top plan view of a bottom surface of the truck bag of the present invention having four anchoring assemblies.

In FIG. 2, the bottom surface 26 of the truck bag 10 is shown. The bottom surface 26 also includes four anchoring loop assemblies 28 positioned at the four corners of surface 26.

Figure 3:
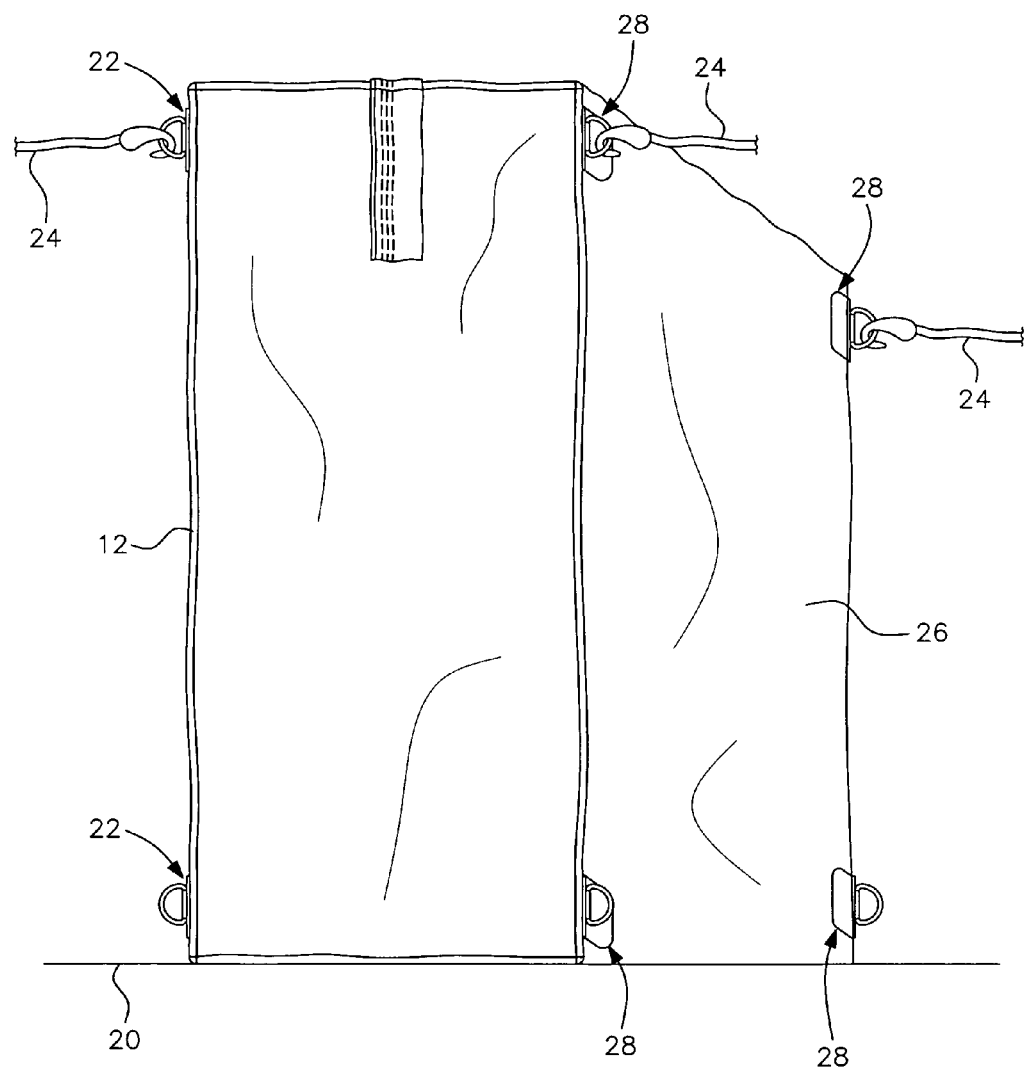
FIG. 3 illustrates the mounting of the truck bag of the present invention in a vertical orientation in the bed of a pick-up truck.

In FIG. 3, the truck bag is shown aligned in a vertical orientation with respect to the bed 20 of a pick-up truck. In this orientation, the two upper anchor loop assemblies 28 of bottom surface 26 are secured to anchoring ropes or bungee cords 30 and the two upper anchoring loop assemblies 22 of the upper surface 12 of the truck bag are also secured by ropes or bungee cords 30. Only one anchor loop assembly 22 is shown in FIG. 3 for illustrative purposes.

Figure 4:
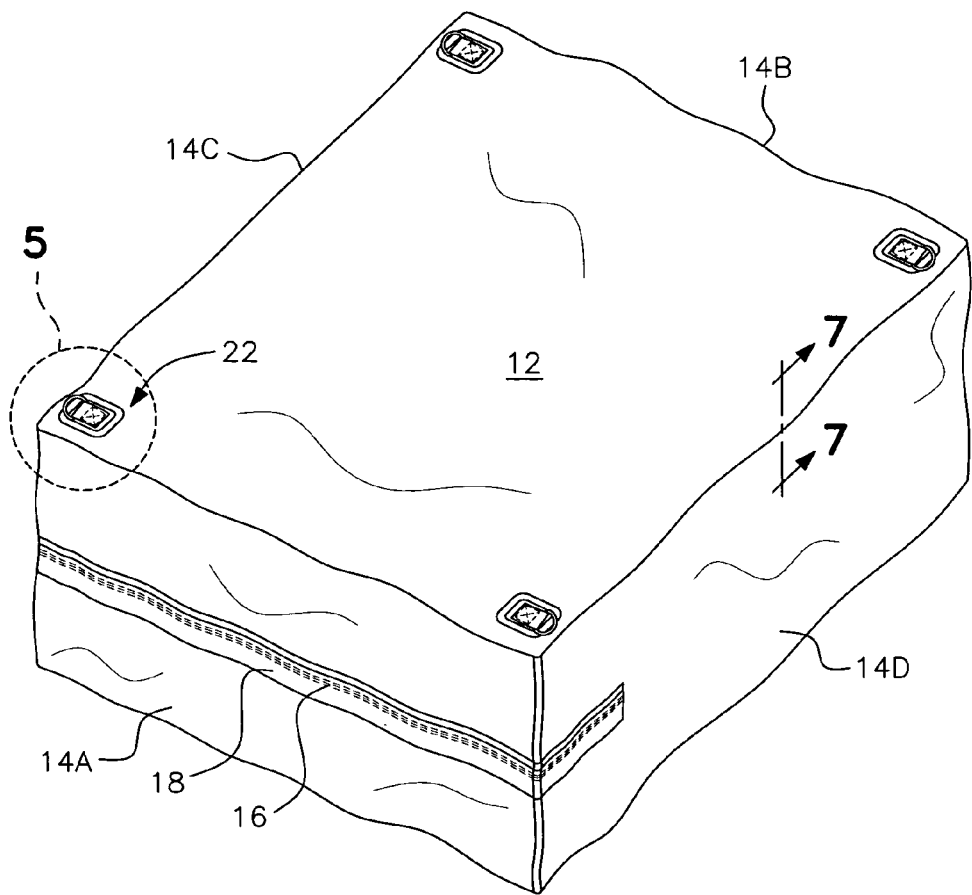
FIG. 4 illustrates the zipper at one end of the bag having a covering flap as well as anchoring assemblies positioned at the four corners of the upper surface of the bag.
Figure 5:
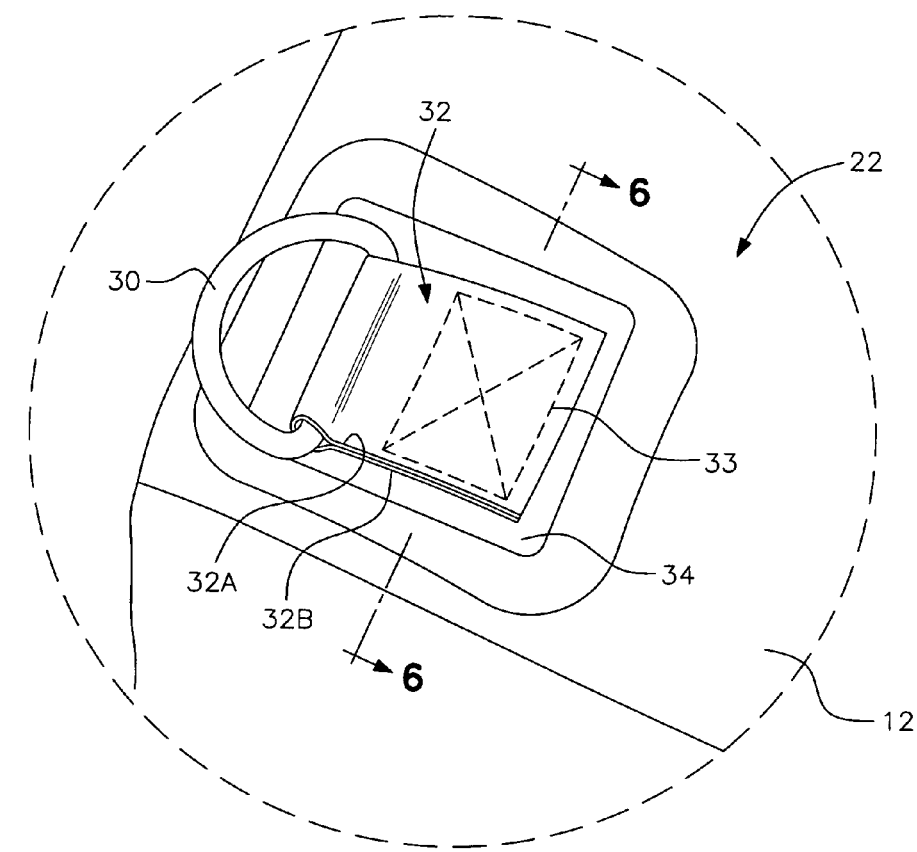
FIG. 5 is an enlarged, detailed view of the area encircled in FIG. 4.

As shown in FIG. 4, an anchor loop assembly is shown in each corner of upper surface 12 of the truck bag. As shown in more detail in FIGS. 5 and 6, the anchor loop assembly 22 includes a metal D-ring 30. The D-ring is held in place by a single piece of heavy duty fabric or canvas 32 which is folded over onto itself to form sections 32A and 32B. The two sections 32A and 32B are stitched together by stitching 33 to penetrate through the two sections and through a rectangular backing flap 34. The backing flap 34 is thereby secured to the fabric 32 and the D-ring 30 is captured in position.

Figure 6:
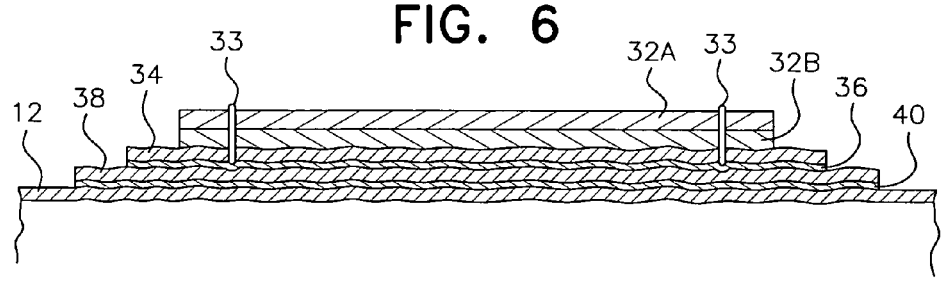
FIG. 6 is a cross-sectional view taken along line 6-6 of FIG. 5.

As shown in more detail in FIG. 6, the backing flap 34 is adhered by adhesive layer 36 to a larger anchoring patch 38. Epoxy may be used as adhesive 36. The backing flap 34 and anchoring patch 38 are then heat sealed together.

The assembly of the backing flap 34, anchoring patch 38, fabric 32 and D-ring 30 are then applied by adhesive 40 onto the upper surface 12 of the truck bag. Anchoring patch 38 and upper surface 12 are also heat sealed or heat fused together.

The backing flap 34 and anchoring patch 38, as well as the truck bag 10, are made of an extremely tough, durable, waterproof PVC polyvinyl material. This material is resistant to the outside elements and provides a waterproof enclosure to the contents of the bag.

Figure 7:
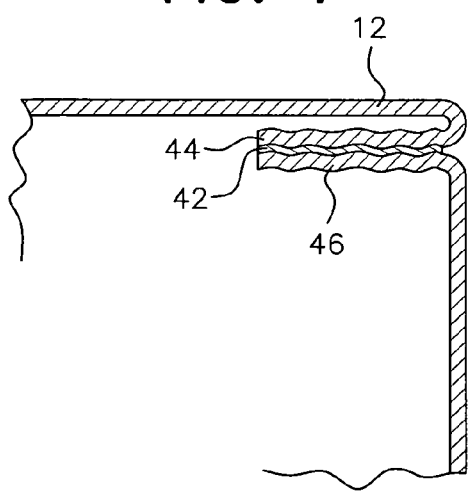
FIG. 7 is a cross-sectional view taken along line 7-7 of FIG. 4.

As shown in FIG. 7, the seams between the upper surface 12 and the lower surface 26 and the sidewalls 14A, 14B, 14C and 14D are also secured together by the use of an adhesive layer 42 interposed between folded over edge sections 44, 46 of the respective walls of the truck bag. The folded over edge sections 44, 46 are heat sealed or heat fused together.

The assembly of the upper, lower and sidewalls of the bag provides a waterproof enclosure. An opening at one end of the bag through the zipper 16 provides easy access to the interior of the bag when empty and access to the contents of the bag when packed.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A truck storage bag for mounting in a bed of a pick-up truck, said storage bag comprising
    an upper surface,
    a lower surface, and
    sidewalls interconnecting the upper surface and the lower surface, the sidewalls being adhesively secured and heat fused to the upper surface and the lower surface,
    the upper surface, the lower surface and the sidewalls being waterproof and defining an interior space protected from access by water,
    the upper surface and the lower surface each including a plurality of anchoring loop assemblies,
    the upper surface including four anchoring loop assemblies for connection to sidewalls of the pick-up truck and thereby supporting the upper surface in an upright position, said four anchoring loop assemblies being located at each of four corners of the upper surface spaced inwardly from the connection of the sidewalls and the upper surface,
    the lower surface including four anchoring loop assemblies for connection to the sidewalls of the pick-up truck, said four anchoring loop assemblies of said lower surface being located at each of four corners of the lower surface spaced inwardly from the connection of the sidewalls and the lower surface,
    said anchoring loop assemblies including a folded over section of fabric, said folded over section of fabric having a lower portion and an upper portion, said lower portion being sewn to a backing flap, said backing flap being adhesively secured and heat fused to an anchoring patch, and said anchoring patch being adhesively secured and heat fused to one of the upper surface and the lower surface.

2. The truck storage bag of claim 1, wherein said anchoring loop assemblies include a ring held by said folded over section of fabric.

3. The truck storage bag of claim 1, wherein the upper surface, the lower surface and the sidewalls are made of PVC material.

4. A pick-up truck bed storage device for mounting in a bed of a pick-up truck, said storage device comprising
    a bag having an upper surface, a lower surface and sidewalls interconnecting said upper surface and said lower surface, and
    an opening in at least one of the sidewalls for gaining access to an interior of the bag,
    the upper surface, the lower surface and the sidewalls being waterproof and defining an interior space protected from access by water,
    the upper surface and the lower surface each including a plurality of anchoring loop assemblies,
    the upper surface including four anchoring loop assemblies for connection to sidewalls of the pick-up truck and thereby supporting the upper surface in an upright position, said four anchoring loop assemblies being located at each of four corners of the upper surface spaced inwardly from the connection of the sidewalls and the upper surface,
    the lower surface including four anchoring loop assemblies for connection to the sidewalls of the pick-up truck, said four anchoring loop assemblies of said lower surface being located at each of four corners of the lower surface spaced inwardly from the connection of the sidewalls and the lower surface,
    said anchoring loop assemblies including by a folded over section of fabric, said folded over section of fabric having a lower portion and an upper portion, said lower portion being sewn to a backing flap, said backing flap being adhesively secured and heat fused to an anchoring patch, and said anchoring patch being adhesively secured and heat fused to one of the upper surface and the lower surface.

5. The pick-up truck bed storage device of claim 4, wherein a zipper controls access to the opening.

6. The pick-up truck bed storage device of claim 4, wherein the upper surface, the lower surface and the sidewalls are made of PVC material.

7. The pick-up truck bed storage device of claim 4, wherein each of the anchoring loop assemblies includes a ring.

8. The pick-up truck bed storage device of claim 7, wherein the backing flap is smaller than the anchoring flap.

\* \* \* \* \*